Jan. 24, 1961 M. MORSE 2,968,840
METHOD OF MOLDING AND BONDING SILICONE RUBBER TO METAL
Filed April 26, 1957 2 Sheets-Sheet 1

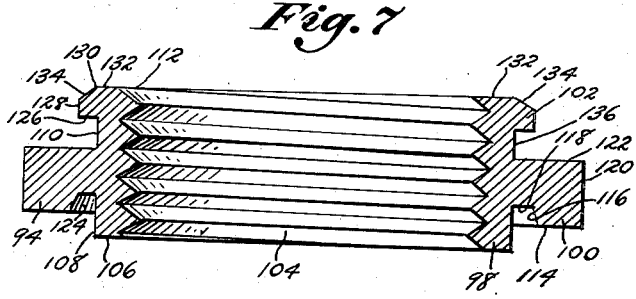
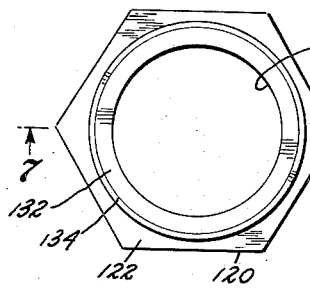
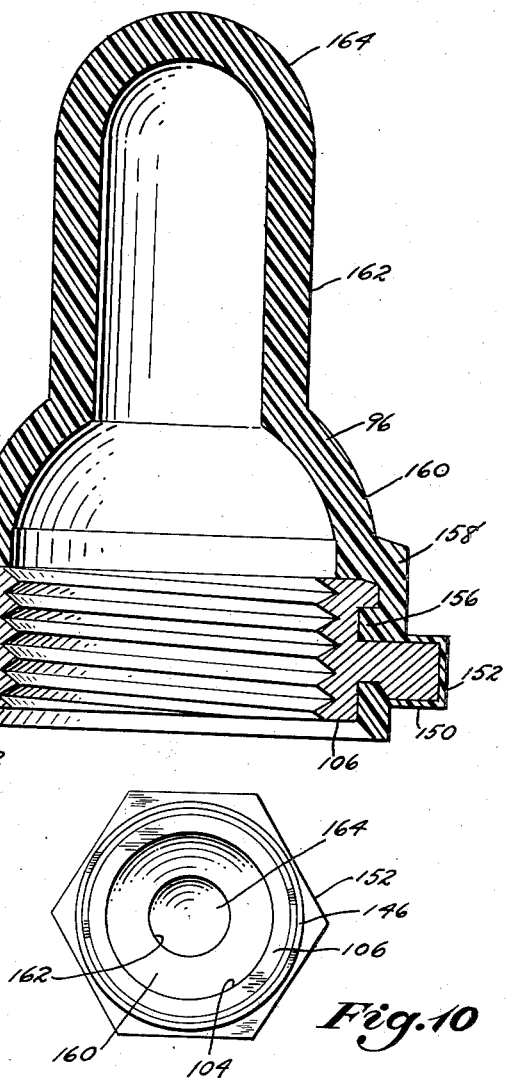
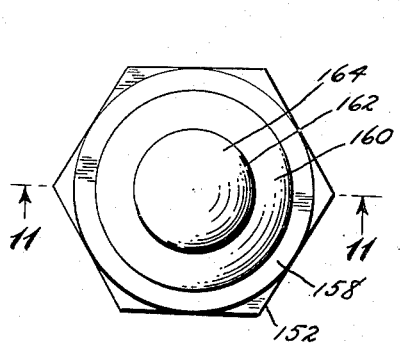
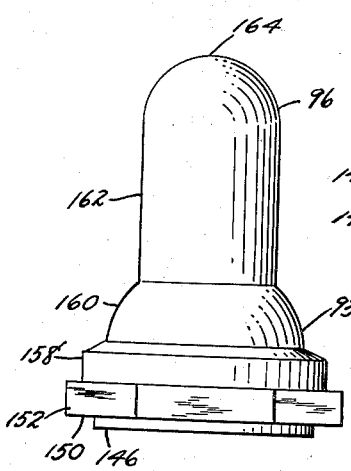

United States Patent Office 2,968,840
Patented Jan. 24, 1961

2,968,840

METHOD OF MOLDING AND BONDING SILICONE RUBBER TO METAL

Milton Morse, Bronx, N.Y.
(252 Hawthorne Ave., Yonkers 5, N.Y.)

Filed Apr. 26, 1957, Ser. No. 655,215

1 Claim. (Cl. 18—59)

This invention relates generally to the field of forming hermetic sealing devices, of the type disclosed in my copending application Serial No. 354,052, filed May 11, 1953, now Patent No. 2,795,144, and more particularly to an improved method for making the same.

Devices of this type normally include a metallic nut element having a threaded portion engageable with a corresponding thread to secure the same in place, and a resilient member molded or bonded to the nut element in such a manner as to be distorted when the same is tightened in position, thereby effecting the seal. Although natural rubber as in the past, which provided a source of excellent material to make the resilient part of the device, it is preferable to use silicone rubber where possible, in order to avoid the disadvantages of natural rubber which include brittleness at low temperatures and deterioration at high temperatures.

Silicone rubber which is formed from a polymerized silicone oil has many of the properties of natural rubber but difficulty has been found in securing an adequate bond between a boot or resilient element formed from the same and the metallic nut element. While it is known in the art to drill openings in the nut element and allow the molded silicone rubber to flow through the same and to connect with silicone rubber at the opposite end of the hole, this procedure is not desirable because it does not provide a completely encircling seal or bond, also owing to the large quantites of silicone rubber which are used to fill the holes, and the necessity of involving metallic casting or machining to form the holes in the nut element. This is particularly true when it is appreciated that the cost of silicone rubber is many times that of ordinary rubber.

It is therefore among the principal objects of the present invention to provide a method of forming an improved sealing device including a metallic nut element and a silicone rubber boot element, in which the above mentioned disadvantages have been substantially eliminated.

Another object of the invention lies in the provision of a method of forming sealing device structure of the class described in which the cost of fabrication may be of a reasonably low order, with consequent wide sale, distribution and use.

A further object of the invention lies in the provision of a method of forming a device of the class described and possessed of the above advantages which require no intricate machining or forming of the metallic nut element, and in which the entire device may be made using tools and techniques already known and existing in the art.

A still further object of the invention lies in the provision of a method for the fabrication of sealing devices of the class described in which resort is made to the natural properties of silicone rubber to obtain an adequate bond between the nut element and the boot element.

These objects, as well as other incidental ends and advantages, will become more clearly apparent during the course of the following disclosure, and be pointed out in the appended claim.

On the drawing, to which reference will be made in the specification, similar reference characters have been employed to designate corresponding parts throughout the several views.

Figure 6 is a plan view of a nut element comprising a part of a second embodiment of the invention.

Figure 7 is an enlarged vertical sectional view as seen from the plane 7—7 on Figure 6.

Figure 8 is a plan view of a completely assembled nut element and boot element comprising the second embodiment.

Figure 9 is a side elevational view of the second embodiment.

Figure 10 is a bottom plan of the second embodiment.

Figure 11 is a vertical sectional view thereof as seen from the plane 11—11 on Figure 8.

Figure 1:
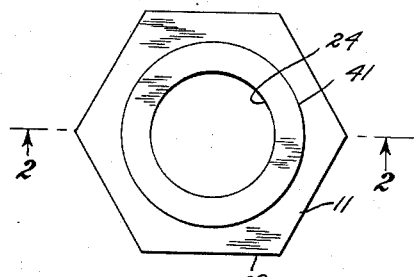
Figure 1 is a plan view of a nut element comprising a part of a first embodiment of the invention.
Figure 2:
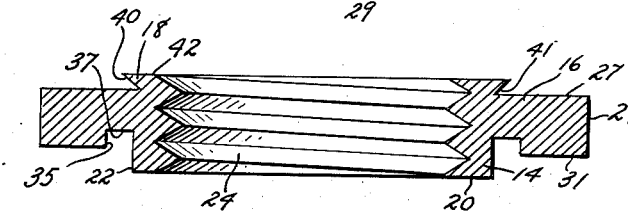
Figure 2 is an enlarged vertical sectional view as seen from the plane 2—2 on Figure 1.
Figure 3:
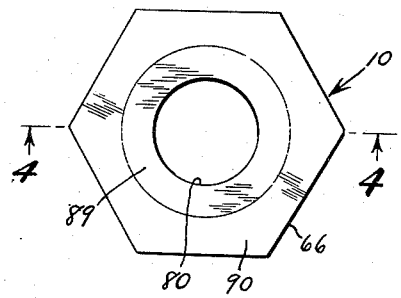
Figure 3 is a plan view of the first embodiment showing the boot element in integrated condition upon the nut element.

Before entering into a detailed consideration of the structural aspects of the present invention, a brief discussion of the properties of silicone rubber is in order. As is known in the art, silicone rubber is made from silicone oil in which the molecule is made heavy by the addition of additional atoms within the molecule, resulting in the oil thickening to finally become a gum and ultimately a flexible solid resembling rubber, in the presence of a catalyst, usually benzoyl peroxide which is present in amounts ranging from one-half of one percent to one percent by weight.

The standard injection molding technique using this material involves curing at temperatures ranging from 200° (F.) to 260° (F.) for approximately one minute, and subsequent heat treatment for several hours at approximately 450° (F.). During the curing procedure, large amounts of benzoic acids are liberated in gaseous form, and if the same is not liberated from the mold, blowholes and spongyness of consistency will result. In extreme cases, the silicone rubber depolymerizes, and tends to return to its original state. During the depolymerization process an intermediate product is formed of tar-like consistency which possesses great adhesive properties with an affinity for both silicone rubber and metal. It is the utilization of this intermediate compound formed during the molding procedure which results in a superior article of manufacture.

With the foregoing in view, reference is now made to the drawings. In accordance with the first embodiment of the invention as seen on Figures 1 to 5, inclusive, the device, generally indicated by reference character 10 comprises broadly a nut element 11 and a boot element 12.

The nut element 11 may be of machined or die cast construction, and includes a cylindrical member 14, a flange member 16 and a boot retaining member 18.

The cylindrical member 14 is bounded by a bottom surface 20, a side surface 22 and is provided with a threaded bore 24 engageable with threaded means (not shown) on the device to be sealed. The flange member 16 is generally planar in configuration and extends radially from the axis of the cylindrical member 14. It is bounded by an upper surface 27, an outer peripheral surface 29 which may be of hexagonal or polygonal shape and a lower surface 31. An annular groove is formed adjacent to the lower surface 31, the same including a side surface 35, and a bottom surface 37, a portion of the surface 22 defining the inner boundary of the groove. As best seen on Figure 2, the cross section of the groove is rectangular in configuration, the same having a depth of between .010 and .030 inch and a width ranging between .015 and .040 inch. These dimensions are critical, as will more fully appear herein.

The boot retaining member 18 is formed above the flange member 16, and includes an angularly disposed surface 40 and an upper surface 42. The angularly disposed surface 40 forms an annular recess 41 of generally triangular cross section the depth of which as measured along a line bisecting the acute angle formed between the surfaces 40 and 27, ranges from .010 to .030 inch; and the width at the widest part thereof, as measured along a perpendicular to the bisecting line and extending through the edge formed by the surfaces 40 and 42 of which ranges between .015 and .040 inch.

Figure 4:
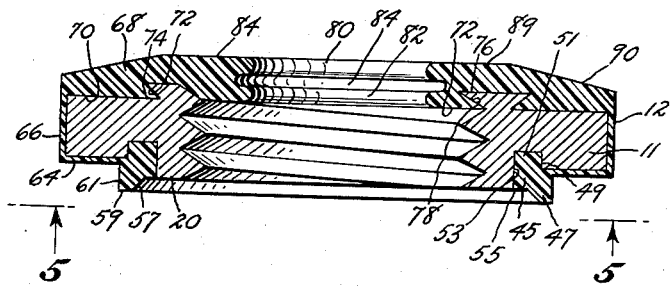
Figure 4 is an enlarged vertical sectional view as seen from the plane 4—4 on Figure 5.
Figure 5:
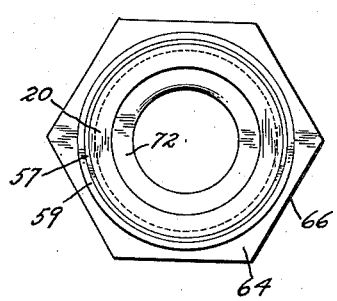
Figure 5 is a bottom plan as seen from the plane 5—5 on Figure 4.

The boot element 12 is molded upon the nut element 11 as best seen on Figure 4 of the drawing. The boot element includes an annular groove-engaging member 45, and a compressible member 47 formed substantially integrally therewith. The groove-engaging member 45 is bounded by an outer surface 49, a bottom surface 51, an inner surface 53 and a lower surface 55. The compressible member 47 includes an angularly disposed surface 57, a lower surface 59 and an outer surface 61, the same being adapted to be deformed in a radial direction, as is well known in the art, when in use.

The flange member 16 is preferably enclosed by lower and outer protective overlay members 64 and 66, respectively, which are preferably not over .005 in thickness. Disposed above the flange member 16 and engaging the boot retaining member 18 is an upper sealing member 68 adapted to cause a seal about a rotating shaft extending through the threaded bore 24 of the nut element 11. It includes a lower surface 70, and an angularly disposed outer surface 72 which form a wedge shaped portion 74 adapted to engage the recess 41. The inner surface 76 merges with a thread engaging surface 78, which partially engages the bore 24 during molding. A pair of annular projections 80 and 82 define an annular groove 84 in which there may be disposed a silicone lubricant (not shown). The outer surface 87 includes a planar portion 89 and a frusto-conical portion 90.

The device is assembled by placing the nut element 11 in a suitable mold (not shown) and injecting the silicone rubber thereabout. During the curing, which requires approximately one-half minute at temperatures ranging from 200° to 260° (F.), the liberated benzoic acid escapes from the body of the boot element with relatively little difficulty except for those portions where the same is surrounded by metal on three sides, namely the groove 33 and the recess 41. Here, owing to the dimensions of the cross sections involved, the benzoic acid reaches the exposed surfaces of the groove and recess, and creates a partial depolymerization resulting in the formation of the adhesive product described hereinabove. After post-curing heat treatment, it is practically impossible to remove the cured rubber from the groove or recess without physically cutting the same therefrom.

When the various recesses and grooves are of dimensions other than those recited, namely a depth of between .010 and .030 inch, and a width between .015 and .040 inch, the desired bonding effect is not achieved. Where the recess or groove is undersized, difficulty is encountered in forcing in a sufficient amount of fluid silicone rubber to completely fill the cavity. Further, the small size of cross section obtained results in a bond without adequate mechanical strength, that is to say the rubber is subject to tearing under stress immediately adjacent the bond. Another problem occurs with undersized cross sections in that too much of the free benzoic acid is confined within the groove, resulting not only in the formation of an adhesive bond between the rubber and the surface of the groove, but excessive depolymerization and sponginess occurs in the body of the rubber. Where the cross section of the groove or recess is oversized, too much of the benzoic acid escapes in the normal manner resulting in the failure to create a sufficient amount of adhesive bond between the rubber and the metallic surface defining the groove or recess. Here, the rubber is possessed of sufficient mechanical strength but the bond is not.

Turning now to the second embodiment of the invention, as illustrated on Figures 6 to 11, inclusive of the drawing, the device, generally indicated by reference character 93 comprises broadly a nut element 94 and a boot element 96.

The nut element 94 is formed in a manner generally similar to that of the first embodiment and includes a cylindrical member 98, a lower flange member 100 and an upper flange member 102.

The boot element 96 is provided with an axially disposed threaded bore 104, a bottom surface 106, a lower peripheral surface 108, an upper peripheral surface 110 and a top surface 112. The lower flange member 100 includes a first lower surface 114, an angularly disposed surface 116, a second lower surface 118, an outer peripheral surface 120 and an upper planar surface 122. The surfaces 114 and 116 together with the surface 108 define a lower groove 124 of generally trapezoidal cross section.

The upper flange member 102 includes a lower surface 126, an outer peripheral surface 128, and an upper surface 130 including a planar portion 132 and a frusto-conical portion 134. An upper groove 136 is defined between the upper and lower flange members 100 and 102, the dimensions of the same, together with the dimensions of the groove 124 lying within the limits set forth in the description of the first embodiment.

The boot element 96 is formed in a manner similar to that of the first embodiment, and includes a lower annular groove-engaging member 138, the same having an upper surface 140, an inner vertically disposed surface 142, an inclined surface 144, a bottom surface 146 and an outer vertical surface 148. Lower and outer overlay members 150 and 152 correspond to those of the first embodiment.

The upper annular groove-engaging member 156 is formed integrally with a first cylindrical member 158, a hemispheroidal member 160, a second cylindrical member 162 and a hemispherical member 164 which define a chamber 166 adapted to surround a toggle switch (not shown) of well known type.

It may thus be seen that I have invented novel and highly useful improvements in hermetic sealing devices and a method of making the same, in which there has been provided a construction which assures positive bonding between the nut and boot elements. Resort is made to a peculiar property of silicone rubber by permitting a small degree of partial depolymerization of the material to form an intermediate product having great adhesive properties between the nut and boot element. By confining the limits of certain grooves and recesses in the nut element, consistency of bonding is assured with little technical difficulty.

I wish it to be understood that I do not consider the invention limited to the precise details of structure shown and set forth in this specification, for obvious modifications will occur to those skilled in the art to which the invention pertains.

I claim:

In a method of bonding silicone rubber having therein a substance capable of liberating benzoic acid under curing conditions to the outer surfaces of a metallic sealing device the steps of: (1) forming a groove on the exposed surfaces of said metallic device having a depth of from .01 to 03 inch and a width at the widest portion thereof from .015 to .040 inch; (2) placing said device in a vented injection mold; (3) injecting said silicone rubber into said mold to fill said mold and said groove; (4) curing said silicone rubber for approximately ½ minute at a temperature ranging from 200 degrees to 260 degrees F. to cause liberated benzoic acid to be vented from the bulk of the silicone rubber, except for that portion thereof disposed in said groove where partial depolymerization is effected, said partial depolymerization forming a tar-like adhesive bonding said last mentioned portion of silicone rubber within said groove to a greater degree than that existing between said metallic device and the remaining portions of said silicone rubber.

References Cited in the file of this patent

UNITED STATES PATENTS

| | | |
|---|---|---|
| 2,266,432 | Morin et al. | Dec. 16, 1941 |
| 2,324,978 | Lohrand et al. | July 20, 1943 |
| 2,459,543 | Schmerheim | Jan. 18, 1949 |
| 2,462,023 | Johanson et al. | Feb. 15, 1949 |
| 2,786,359 | Karlan et al. | Mar. 26, 1957 |
| 2,795,144 | Morse | June 11, 1957 |

FOREIGN PATENTS

| | | |
|---|---|---|
| 649,015 | Germany | Aug. 13, 1937 |

OTHER REFERENCES

Automotive Industries (Silicone News), opposite page 210, vol. 110, No. 2, Jan. 15, 1954.